(12) United States Patent
Snell et al.

(10) Patent No.: US 6,275,479 B1
(45) Date of Patent: Aug. 14, 2001

(54) MULTIPLEXED POWER AMPLIFIERS FOR SATELLITE COMMUNICATION SYSTEM

(75) Inventors: William L. Snell, Monmouth; Mark D. Thompson, Hood River, both of OR (US)

(73) Assignee: Spacecode LLC, Monmouth, OR (US)

( * ) Notice: Subject to any disclaimer, the term of this patent is extended or adjusted under 35 U.S.C. 154(b) by 0 days.

(21) Appl. No.: 09/273,306

(22) Filed: Mar. 19, 1999

(51) Int. Cl.$^7$ .................................................. H04B 7/185
(52) U.S. Cl. ........................ 370/318; 370/319; 455/13.3
(58) Field of Search ................................. 370/316, 317, 370/318, 319, 329; 455/13.3, 13.4

(56) References Cited

U.S. PATENT DOCUMENTS

| | | | | |
|---|---|---|---|---|
| 4,599,619 | * | 7/1986 | Keigler et al. | 343/352 |
| 4,706,239 | * | 11/1987 | Ito et al. | 370/57 |
| 5,033,108 | * | 7/1991 | Lockood | 455/12 |
| 5,924,015 | * | 7/1999 | Garrison et al. | 455/13.4 |

* cited by examiner

Primary Examiner—Melvin Marcelo
(74) Attorney, Agent, or Firm—Ipsolon LLP

(57) ABSTRACT

A communication satellite transmitting system includes communication signal amplifiers (e.g., traveling wave tube (TWT) amplifiers) with outputs that are multiplexed among multiple transmit horns, each of which transmits a downlink communication signal to a corresponding geographic cells. In one implementation, each TWT amplifier is multiplexed among at least three transmit horns.

42 Claims, 9 Drawing Sheets

MULTIPLEXED POWER AMPLIFIERS FOR SATELLITE COMMUNICATION SYSTEM

FIELD OF THE INVENTION

The present invention relates to satellite communication systems and, in particular, to a communication satellite with communication signal amplifiers that are multiplexed to transmit simultaneously communication signals to different geographic regions and/or communication signal receivers that are multiplexed to receive simultaneously communication signals for different geographic regions.

BACKGROUND AND SUMMARY OF THE INVENTION

A conventional communication satellite in geosynchronous orbit has a communication signal receiving system and a communication signal transmitting system. The receiving system includes a satellite receiving reflector that receives multiple communication uplink signals from one or more terrestrial transmitting stations and concentrates the signals at corresponding ones of multiple receiving horns, which pass the communication uplink signals through an input filter system to a satellite low noise amplifier (LNA) and downconverter system.

A communication multiplexer system receives the low noise amplified and frequency converted uplink signals and channelizes and routes the signals to the transmitting system for transmission to terrestrial recipient stations. The transmitting system typically includes an amplifier system, which may include traveling wave tube (TWT) amplifiers, to provide high reliability, high power output amplification. The outputs of the high power amplifier system are connected through an output filter system to one or more transmit horns for transmission as downlink signals via a satellite transmit reflector. Communication satellite systems have limited bandwidth and power for transmitting downlink communication signals. The amount of effective bandwidth in a communication satellite system directly corresponds to the amount of traffic that can be carried (i.e., the satellite's capacity). Typically, satellite downlink communications are transmitted over a wide area, which may be covered by an array of narrow zone or "spot" beams to make maximal use of the physical or actual bandwidth that is allocated. This is called frequency re-use and it allows the frequency band of the actual bandwidth to be used multiple times and thereby increase the effective bandwidth for satellite communications.

Each spot beam is associated with a geographic region called a cell. Each spot beam typically includes two communication signals, one each of two opposite polarizations (e.g., horizontal/vertical or right-/left-circular). The satellite includes a TWT amplifiers for each communication signal for each cell. As the number cells increases, the number of TWT amplifiers required on the satellite increases at a 2:1 ratio (i.e., two TWT amplifiers for each cell). Due to the power, size, and weight requirements of TWT amplifiers, practicable satellites can carry only a limited number of TWT amplifiers. As a consequence, the one-to-one relationship between communication signal (e.g., TWT) amplifiers and transmitted can severely limit the total capacity of the system. Moreover, the amplification power of each TWT amplifier is limited to practical levels and cannot be increased arbitrarily.

In accordance with the present invention, therefore, a communication satellite transmitting system includes communication signal amplifiers (e.g., traveling wave tube (TWT) amplifiers) with outputs that are multiplexed among multiple transmit horns, each of which transmits a downlink communication signal to a corresponding geographic cell.

In one implementation, each TWT amplifier is multiplexed among at least three transmit horns. With the communication signal amplifiers employing frequency re-use, such as if each amplifier employs common frequency sub-bands for each of multiple communication signals, the 3-to-1 multiplexing allows signals to be transmitted to the geographic cells without any immediately adjacent cells corresponding to the same frequency sub-band. This reduces interference and cross-talk between the signals transmitted to adjacent cells.

As another aspect of this invention, amplification power can be allocated dynamically between the communication signals as they are transmitted to compensate for signal degradation that can be caused by, for example, rain or communication channel traffic. The amplification power can be allocated either between the communication signals amplified by a single amplifier or between the communication signals amplified by different amplifiers. In accordance with the allocation of amplification power, amplification power may be allocated preferentially to cells in regions that are characterized as receiving relatively heavier rains.

As another aspect of the present invention, a communication satellite receiving system includes communication receivers with inputs that are multiplexed among multiple receive horns, each of which receives an uplink communication signal for a corresponding geographic cell. In one implementation, each receiver is multiplexed among at least three receive horns.

The multiplexing of TWT amplifiers and receivers can significantly reduce the numbers TWT amplifiers and receivers required for a given number of geographic cells. This has the advantage of reducing the cost and weight of a satellite and allowing the satellite to provide communications to a greater number of cells. In some prior communication satellite designs, the number of cells to which a satellite could provide communications was limited by the size and weight of the required TWT amplifiers. The multiplexing provided by the present invention can increase the overall capacity of a satellite while simultaneously reducing the cost to manufacture and launch it.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
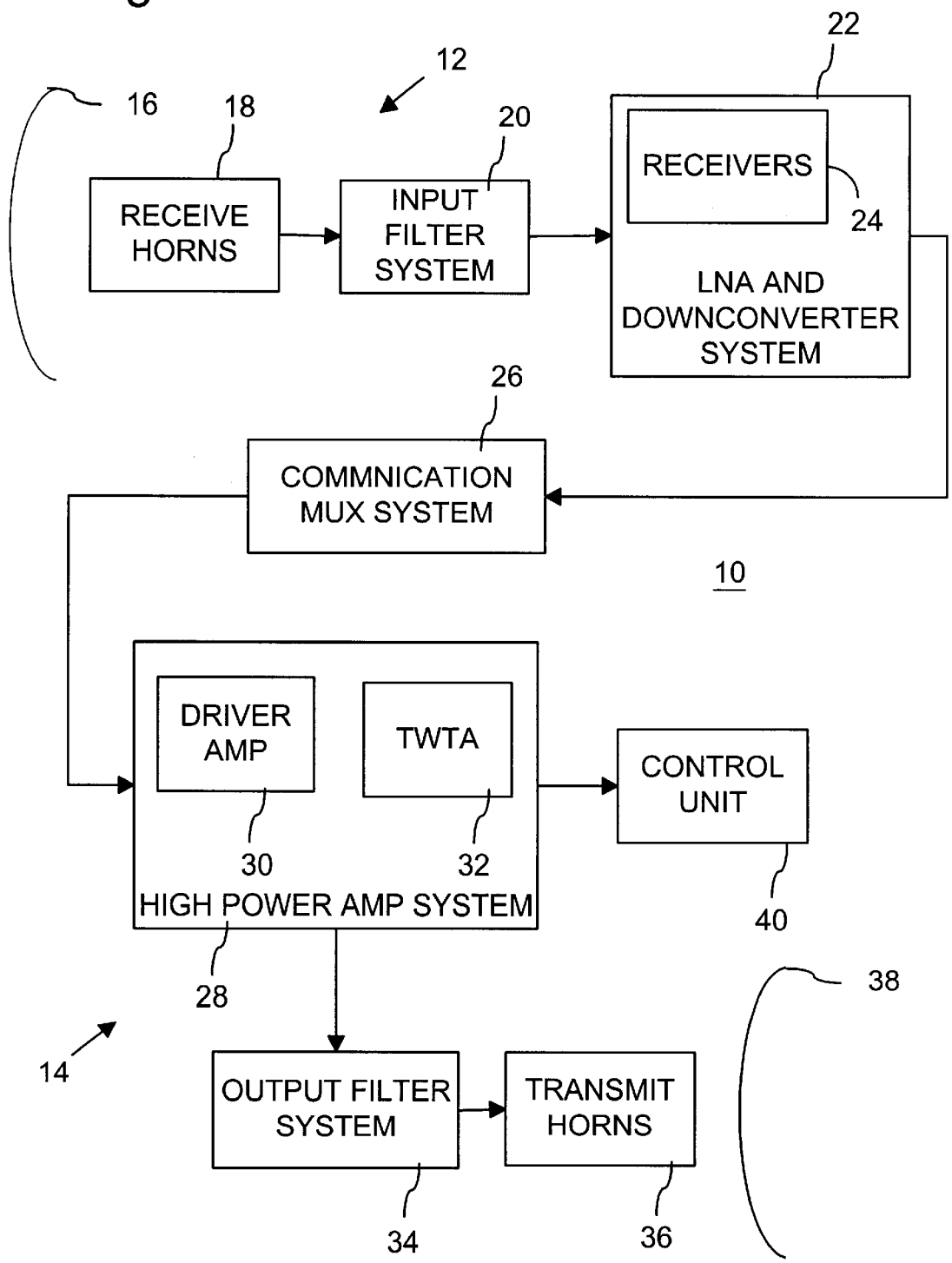
FIG. 1 is a block diagram illustrating a communication satellite.

FIG. 1 is a block diagram of an exemplary implementation of communication satellite 10 in geosynchronous orbit and having a communication signal receiving system 12 and a communication signal transmitting system 14. Receiving system 12 includes a satellite receiving reflector 16 that receives multiple communication uplink signals from one or more terrestrial transmitting stations and concentrates the signals at corresponding ones of multiple receiving horns 18. Receiving horns 18 pass the communication uplink signals through an input filter system 20 to a satellite low noise amplifier (LNA) and downconverter system 22 having multiple individual receivers 24. Each of the uplink communication signals may include multiple separate signals.

Low noise amplifier (LNA) and downconverter system 22 would typically include more individual receivers 24 than are necessary for the number of signals or channels to be handled by satellite 10. The additional receivers 24, or other components, provide redundancy and may be utilized upon the failure of any individual component. Such redundancy is typically utilized in satellite design and may be applied as well as in other systems within satellite 10 that are described below,.

Accordingly, low noise amplifier (LNA) and downconverter system 22 includes switching arrays to route each channel of the uplink signal to the corresponding active receivers 24 that provide pre-amplification of the uplink communication signals and convert them to another (e.g., lower) frequency. For example, uplink signals may be Ku-band signals (i.e., about 14 GHz ) or V-band signals (i.e. about 49–50 GHz), which may be converted to lower ku-band frequencies (e.g., 11–12 GHz). A communication multiplexer system 26 receives the low noise amplified and frequency converted uplink signals and channelizes and routes the signals to appropriate ones of redundant high power amplifiers in a high power amplifier system 28 in transmitting system 14 for transmission to terrestrial recipient stations. In an implementation utilizing FDMA routing techniques, multiplexer 26 channelizes and routes the signals according to their carrier frequencies.

Amplifier system 28 may employ, for example, driver amplifiers 30 with associated traveling wave tube amplifiers 32. Traveling wave tube amplifiers 32 provide high reliability, high power output amplification. The outputs of high power amplifier system 28 are connected through an output filter system 34 to one or more transmit horns 36 for transmission as a downlink signal via a satellite transmit reflector 38. A control unit 40 is bus connected to various ones of these components to control their operation and interaction. The satellite includes power sources, orientation and position control systems, communication control systems, etc. as are known in the art.

Figure 2:
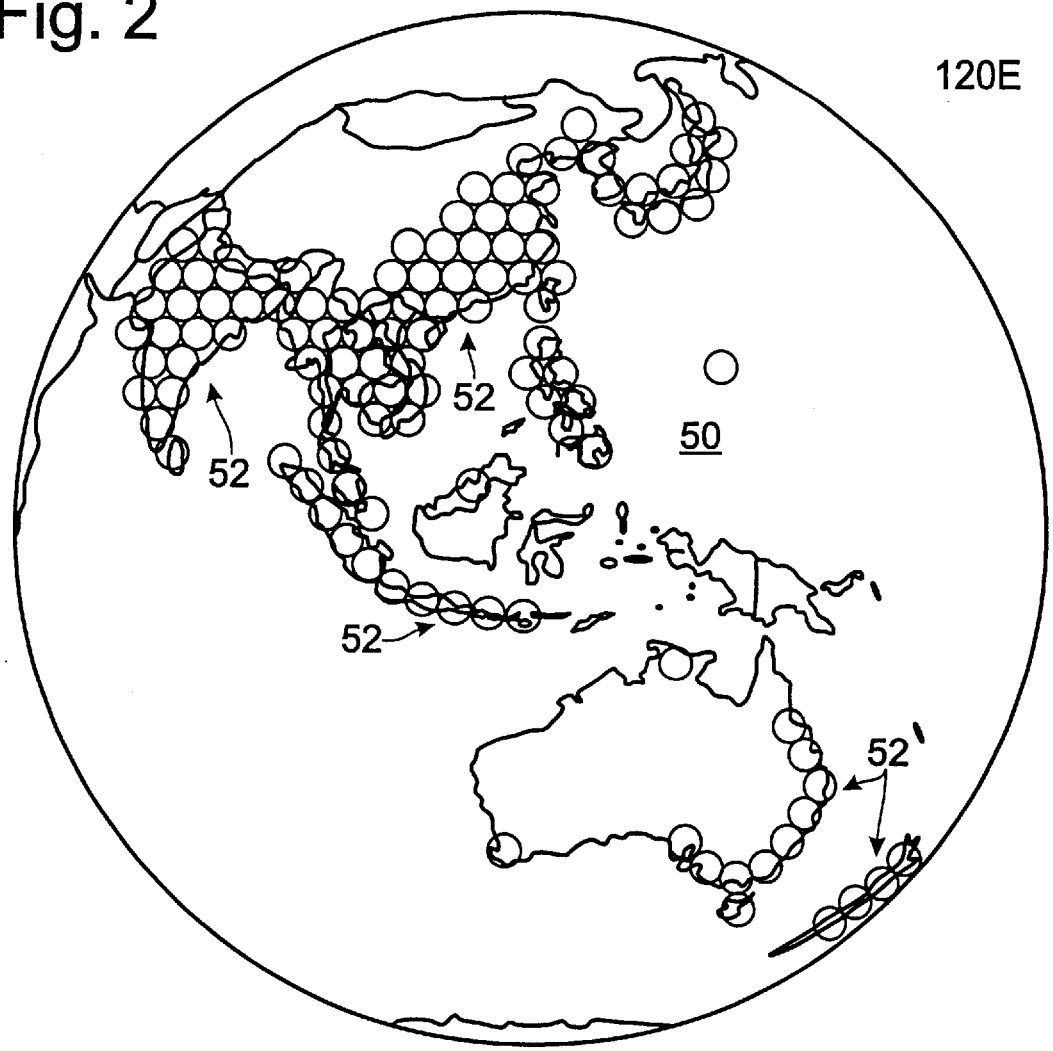
FIG. 2 is an illustration of a satellite telecommunications region having multiple separate downlink cells.

FIG. 2 is an illustration of a satellite telecommunications region 50 having multiple cells 52 (represented by circles) to which one implementation of satellite 10 directs narrow zone communication signals to recipient stations. Cells 52 correspond to different geographic areas within region 50. Different groups of cells 52 receive downlink signals carried on different channels. In some applications, the downlink signal carried on a single channel could be directed to a single cell 52. As is known in the art, transmit horns 36 are arranged in relation to transmit reflector 38 to transmit particular communication signals to particular ones of cells 52.

The transmitting station transmitting a communication signal to a recipient station may be located in the same cell as, or more commonly a different cell from, that of the recipient station. Satellite 10 also communicates with a communication system or network operations center and a satellite control center. The network operations center, sometimes referred to as a NOC, controls and coordinates the transmission of communication over satellite 10. The network operations center obtains and maintains information about the communication traffic and the resource configuration of satellite. The satellite control center transmits and receives tracking, telemetry, and control signals for controlling satellite 10 and its operation.

The network operations center and the control center may be separate or a single integrated control center. Similarly, the network operations center and the satellite control center could be located in different or the same cells 52, or could be completely outside satellite telecommunications region 50. It will be appreciated that the geographic region shown in FIG. 2 is merely illustrative and that operation of the present invention is applicable to other geographic regions.

With routing based upon frequency division multiple access (FDMA) techniques, for example, the cell 52 within which a recipient station is located is associated with a selected channel or FDMA sub-band (e.g., nominal 167 MHz bandwidth channel) of a nominal 3.5 GHz bandwidth V-band uplink channel between a trerrestrial uplink station and satellite 10. Routing of the communication signal to the recipient station includes modulating and upconverting the communication signal to the selected sub-band. Alternatively, if the recipient station represents multiple separate recipient stations in multiple different cells 52, multiple selected channels or sub-bands associated with the cells 52 are identified and the communication signal is modulated and upconverted to the corresponding sub-bands. The routing of the communication signal may further include application of code division multiple access (CDMA) techniques in which a selected code or identifier associated with the recipient station is associated with the FDMA sub-band signal to direct the communication signal specifically to a particular recipient station within its cell 52.

Figure 3:
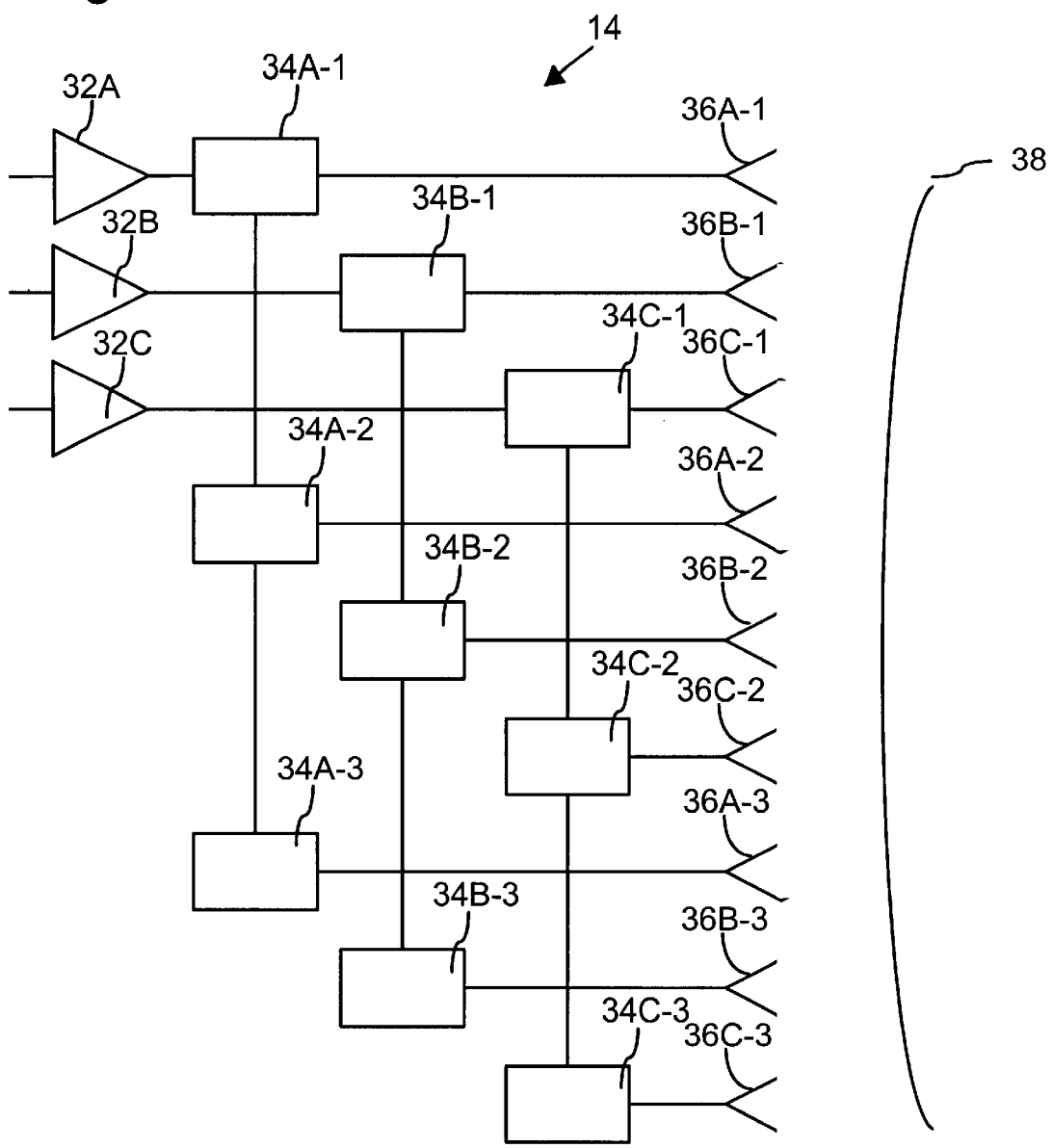
FIG. 3 is a circuit block diagram of communication signal transmitting system with multiplexed communication signal amplifiers.
Figure 4:
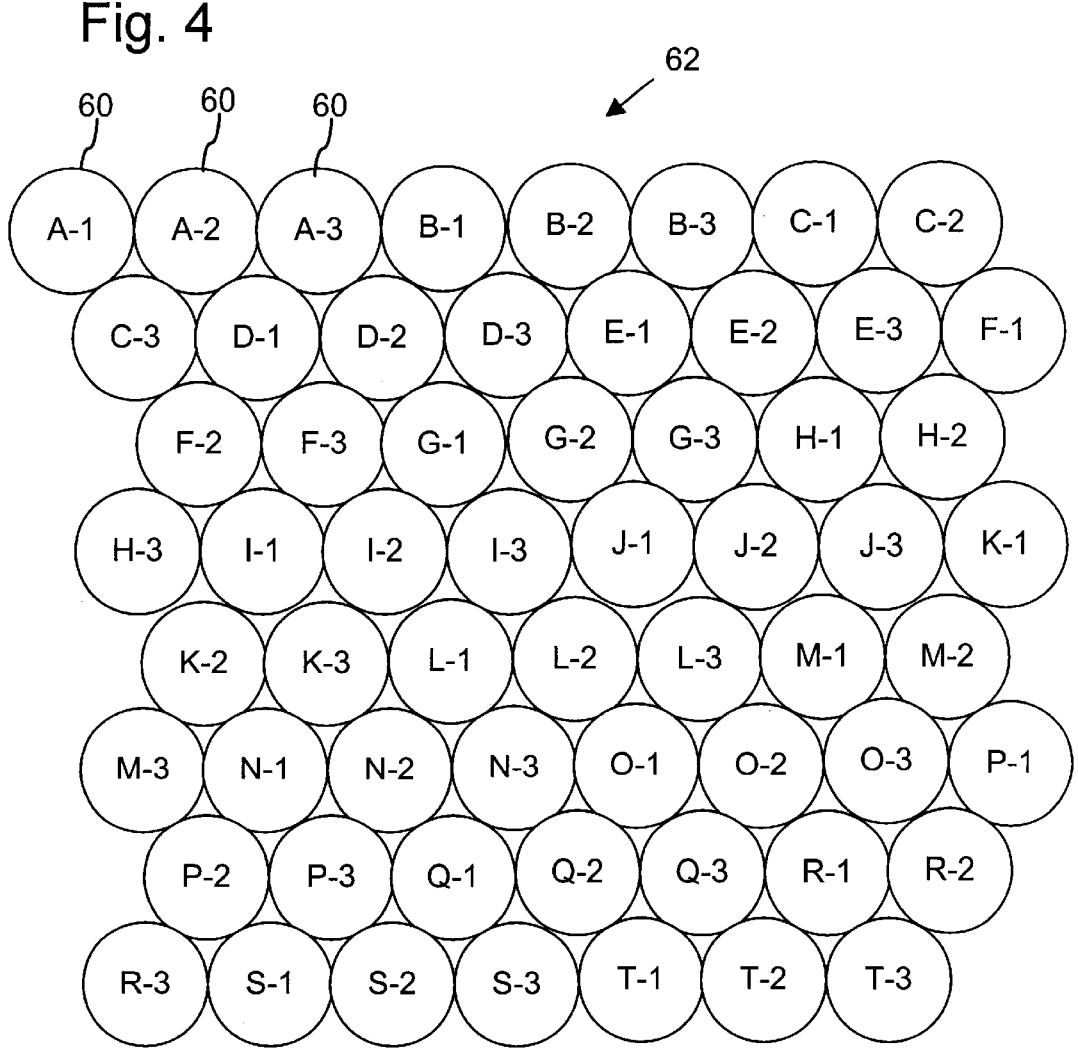
FIG. 4 is a schematic illustration of an array of geographic cells representing a satellite telecommunications region to which 1×3 multiplexed amplifiers direct narrow zone communication signals to recipient stations.

FIG. 3 is a circuit block diagram of communication signal transmitting system 14 with multiplexed traveling wave tube (TWT) amplifiers 32 (only three shown) according to the present invention. In the implementation shown in FIG. 3, each TWT amplifier 32 is multiplexed among three transmit horns 36. Each transmit horn 36 transmits a downlink communication signal to a corresponding one of cells 52 or cells 60 (FIG. 4). It will be appreciated, however, that the illustrated 1×3 multiplexing is merely exemplary and that greater degrees of multiplexing can be applied to TWT power amplifiers 32.

With reference to TWT amplifier 32A, for example, three output frequency filters 34A-1, 34A-2, and 34A-3 pass different portions or segments of a given output frequency band to respective transmit horns 36A-1, 36A-2, and 36A-3. As one example, each TWT amplifier 32, including TWT amplifier 32A, is adapted to amplify and transmit all of the nominal 500 MHz bandwidth of a Ku-band downlink communication channel. Accordingly, output frequency filters 34A-1, 34A-2, and 34A-3 pass signals with frequencies within different nominal 167 MHz sub-bands of the Ku-band channel. With a ku-band downlink communication channel of 12.200–12.700 GHz, frequency filter 34A-1 could pass communication signals for frequencies in the sub-band 12.200–12.367 Ghz, frequency filter 34A-2 could pass communication signals for frequencies in the sub-band 12.367–12.533 Ghz, and frequency filter 34A-3 could pass communication signals for frequencies in the sub-band 12.533–12.700 Ghz.

It will be appreciated that references to the KU-band downlink communication channel is only illustrative and is not a limitation on the scope of application for transmitting system 14. Moreover, each cell would typically receive two communication signals, one each of two opposite polarizations (e.g., horizontal/vertical or right-/left-circular). Accordingly, transmitting system 14 described above would typically be implemented for each of the two polarizations of communication signal. In alternative implementations, solid state amplifiers could be used rather that TWT amplifiers 32. Also, each amplifier could amplify and transmit less than the full bandwidth of a downlink communication channel.

FIG. 4 is a schematic illustration of an array of geographic cells 60 representing a satellite telecommunications region 62 to which 1×3 multiplexed TWT power amplifiers 32 analogous to those of FIG. 3 direct narrow zone communication signals to recipient stations. Cells 60 correspond to different geographic areas within region 62. Different cells 52 receive downlink signals carried on different channels.

More specifically, twenty TWT power amplifiers 32 are 1×3 multiplexed (as in FIG. 3) to direct communication signals to cells 60, which for purposes of illustration are arranged in a simple pattern in comparison to the more exemplary pattern of region 50 (FIG. 2). Cells 60 are designated by alpha-numeric indicators that correspond to particular TWT power amplifiers 32 and multiplexed communication channel sub-bands. For example, cells 60 designated A-1, A-2, and A-3 could receive respective communication sub-bands 12.200–12.367 Ghz, 12.367–12.533 Ghz, and 12.533–12.700 Ghz from a TWT amplifier 32A. Similarly, each of the remaining cells 60 with the numeric suffices -1, -2, and -3 could receive respective communication sub-bands 12.200–12.367 Ghz, 12.367–12.533 Ghz, and 12.533–12.700 Ghz from a corresponding TWT amplifier 32 having a matching alphabetic designation of B-T. Accordingly, all of cells 60 having the same numeric suffix -1, -2, or -3 receive the same communication channel sub-band, although typically different communication signals.

The generally 50 percent lateral offset between successive rows of cells 60 provides a dense-packed or "honeycombed," optionally overlapping, arrangement that minimizes (as shown) or eliminates the portions of region 62 not served by a satellite 10. In addition, with at least 1×3 multiplexing of TWT power amplifiers 32, cells 60 can be arranged to provide spatial separation between cells designated to receive the same channel sub-band. As a result, no two adjacent cells is designated to receive the same channel sub-band.

With reference to FIG. 4, this can be seen from the absence of any two adjacent cells having the same numeric suffix -1, -2, or -3. This eliminates interference between adjacent cells 60 because recipient stations in adjacent cells are tuned to receive different communication channel sub-bands.

Figure 5:
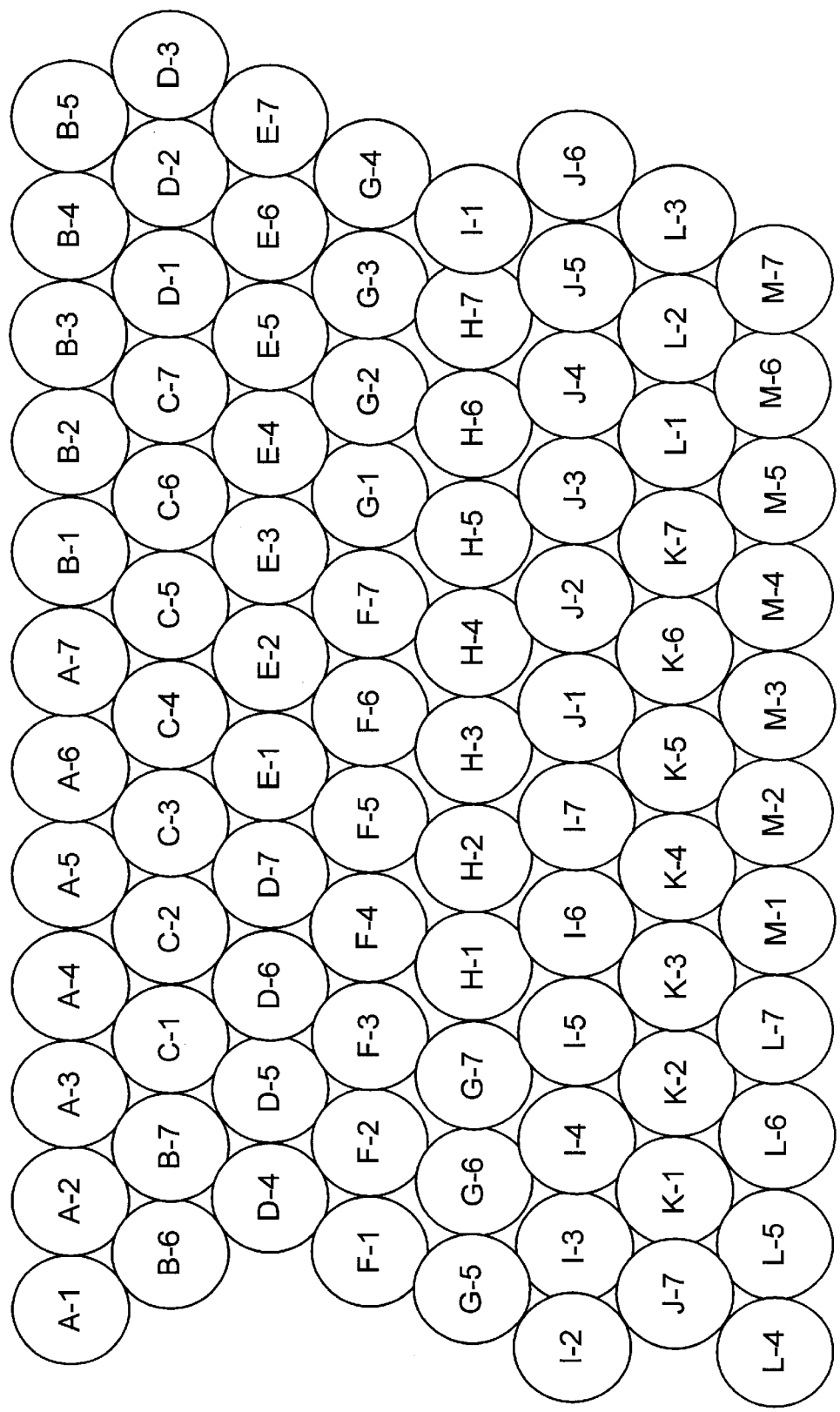
FIG. 5 is a schematic illustration of an array of geographic cells representing a satellite telecommunications region to which 1×7 multiplexed amplifiers direct narrow zone communication signals to recipient stations.

FIG. 5 is a schematic illustration of an array of geographic cells 70 representing a satellite telecommunications region 72 to which 1×7 multiplexed TWT power amplifiers 32 analogous to those of FIG. 3 direct narrow zone communication signals to recipient stations. More specifically, twelve TWT power amplifiers 32 are 1×7 multiplexed to direct communication signals to cells 70, which for purposes of illustration are arranged in a simple pattern in comparison to the more exemplary pattern of region 50 (FIG. 2). Cells 70 are designated by alpha-numeric indicators that correspond to particular TWT power amplifiers 32 and multiplexed communication channel sub-bands.

For example, cells 70 designated A-1 through A-7 could receive from a TWT amplifier 32A respective communication sub-bands each with a width of 71.4 Mhz beginning at a frequency of 12.200 Ghz. Similarly, each of the remaining cells 70 with the corresponding numeric suffices could receive the same corresponding communication sub-bands corresponding TWT power amplifiers 32 having matching alphabetic designations of B-L. Accordingly, all of cells 70 having the same numeric suffix receive the same communication channel sub-band, although typically different communication signals.

Rain can cause signal degradation for satellite downlink communications, particularly at Ku-band (11–12 GHz) and higher frequency communications. Rain can cause downlink signal attenuation of as much as dB (the higher the rain rate the greater the degradation of the signal from a satellite to a ground recipient). Such extreme attenuation can dramatically degrade recipient signal detection and therefore system availability and capacity. In some places, particularly places with generally equatorial climates, heavy rains can cause unacceptable attenuation of satellite downlink communications.

Figure 6:
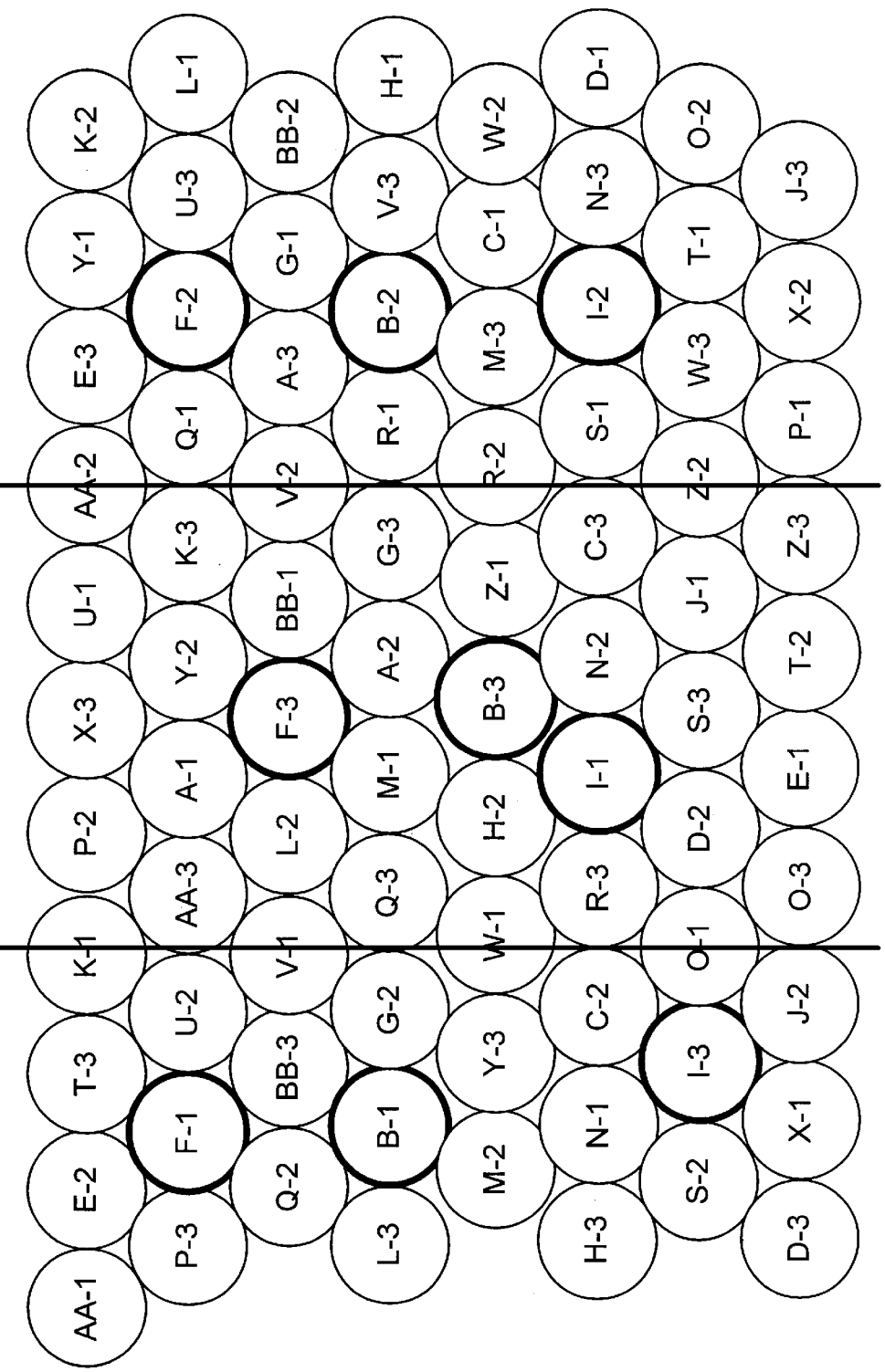
FIG. 6 is a schematic illustration of an array of geographic cells representing a satellite telecommunications region to which 1×3 multiplexed amplifiers direct narrow zone communication signals to recipient stations and in which the cells associated with a given amplifier are dispersed to regions having different rainfall characteristics.

FIG. 6 is a schematic illustration of an array of geographic cells 80 representing a satellite telecommunications region 82 to which 1×3 multiplexed TWT power amplifiers 32 analogous to those of FIG. 3 direct narrow zone communication signals to recipient stations. More specifically, twenty-eight TWT power amplifiers 32 are 1×3 multiplexed to direct communication signals to cells 80. Cells 80 are designated by alpha-numeric indicators that correspond to particular TWT power amplifiers 32 and multiplexed communication channel sub-bands. Cells 80 are arranged generally so that one of the three cells associated with a given TWT amplifier 32 is positioned in each of regions characterized has having light, moderate, and heavy rainfall. It will be appreciated that the light, moderate, and heavy rainfall regions are indicated schematically and that actual geographic regions would typically be far more widely and irregularly distributed.

Several cells 80 are emphasized with darker rings to further illustrate the positioning in different rainfall regions of the three cells associated with a TWT amplifier 32. For example, cells 80 designated B-1, B-2, and B-3 are positioned in the respective light, heavy and moderate rain areas and would receive respective communication sub-bands of 12.200–12.367 Ghz, 12.367–12.533 Ghz, and 12.533–12.700 Ghz from a TWT amplifier 32F. As further examples, cells 80 designated with the F and I prefixes are positioned in the respective light, heavy and moderate rain areas and would receive respective communication sub-bands from TWT power amplifiers 32F and 32I. The cells 80 associated with other TWT power amplifiers 32 are distributed in a similar manner.

Distributing cells 80 associated with a TWT amplifier 32 among light, moderate, and heavy rain areas allows cells 80 experiencing rainfall to utilize excess power margin available from the TWT amplifiers 32 to compensate for, or overcome, signal degradation caused by rain. Each of cells 80 has allocated to it a standard ("no rain") allocation of power from the TWT amplifier 32 and an additional ("rain") allocation of power to boost within a cell 80 experiencing rain the transmission power provided by TWT amplifier 32 for that cell 80. Cells 80 in the regions of light, moderate, and heavy rainfall have respective low, moderate, and large additional ("rain") allocations of power.

It will be apreciated that the distribution of cells 80 in FIG. 6 is highly schematic and that in practice additional factors could be applied to the positioning of the cells associated with each TWT amplifier 32. One factor is to increase, or even maximize, the average separation between cells associated with a TWT amplifier 32. This would generally decrease the chance that the different cells associated with a TWT amplifier would suffer from increased rain simultaneously.

In this regard, the increased or maximized separation between cells could be aligned relative to the general direction that rainy weather patterns move over a region. For example, daily equatorial rains tend to move in a westerly direction. In a equatorial region, increasing or maximizing separations between cells 80 along a generally east-west axis could decrease the chance that the different cells associated with a TWT amplifier would suffer from increased rain simultaneously.

For example, cells 80 associated with a TWT amplifier 32 and located in Arizona, Michigan, and Florida could correspond to respective regions of light, moderate, and heavy rainfall. The standard ("no rain") allocation of power from the common TWT amplifier 32 for each cell 80 could be 25 watts. The additional ("rain") allocations of power could be 10 W, 20 W, and 50 W for the respective regions of light, moderate, and heavy rainfall (i.e., Arizona, Michigan, and Florida). The geographic distribution of the exemplary cells 80 means that it is unlikely that rain will occur in all three regions simultaneously. This reduces the additional power margin required for each cell to maintain communication downlinks. If rain does occur in all three regions simultaneously, the TWT amplifier 32 can deliver to each of the cells the standard ("no rain") and additional ("rain") allocations of power. This would result in 155 W of nominal full-power operation of the TWT amplifier 32.

In the event that there is rain in fewer than all of the cells 80 associated with a TWT amplifier 32, the cell or cells 80 with rain may receive its or their standard (no rain) allocation of power as well as the additional (rain) allocations of power of any cells without rain. Providing a cell 80 where it is raining with additional (rain) allocations of power of any cells without rain can help compensate for, or overcome, downlink signal degradation that can arise from heavier-than-normal rains. For example, signal degradation caused by a heavier-than-normal rain in the exemplary cell 80 in Michigan could be compensated for by utilizing portions of the additional (rain) power normally allocated to cells 80 in Arizona and Florida.

As one illustration, the cells 80 in Arizona and Florida could be allocated their standard (no rain) allocations of power from the TWT amplifier 32 (i.e. 25 W each), and the cell 80 in Michigan could be allocated the sum of the powers allocated to the other cells (i.e., 50 W), as illustrated below, or as much as the remaining power margin available from the TWT amplifier 32.

In one implementation, the allocation of power between cells 80 associated with a TWT amplifier 32 is based upon the relative powers of the uplink signals corresponding to the cells 80. In the illustration above with heavier-than-normal rain in Michigan and with the cells 80 in Arizona and Florida being allocated their standard (no rain) allocations of power, the uplink signal for transmission to the cell 80 in Michigan can have a power that is 3 dB greater than the power of the uplink signals for transmission to the cells in Arizona and Florida. The 3 dB difference in the power of the uplink signals means that the uplink signal for transmission to the cell 80 in Michigan has twice the power of the uplink signals for transmission to the cells in Arizona and Florida and exceeds the 20 W additional ("rain") allocation of power otherwise utilized for Michigan.

The standard (no rain) allocations of power of the multiple operating TWT amplifiers 32 on satellite 10 are selected to be below the overall power capacity available on satellite 10 for signal amplification. As a result, all TWT amplifiers 32 can operate simultaneously at their standard power allocations. The additional (rain) allocations of power of the multiple operating TWT amplifiers 32 on satellite 10 are would typically be selected such that fewer than all of the TWT amplifiers 32 could simultaneously generate additional (rain) allocations of power without exceeding the overall power capacity available on satellite 10 for amplification. As a result, in addition to power allocations between cells 80 associated with a single TWT amplifier 32, power allocations may also be made between TWT amplifiers 32.

Figure 7:
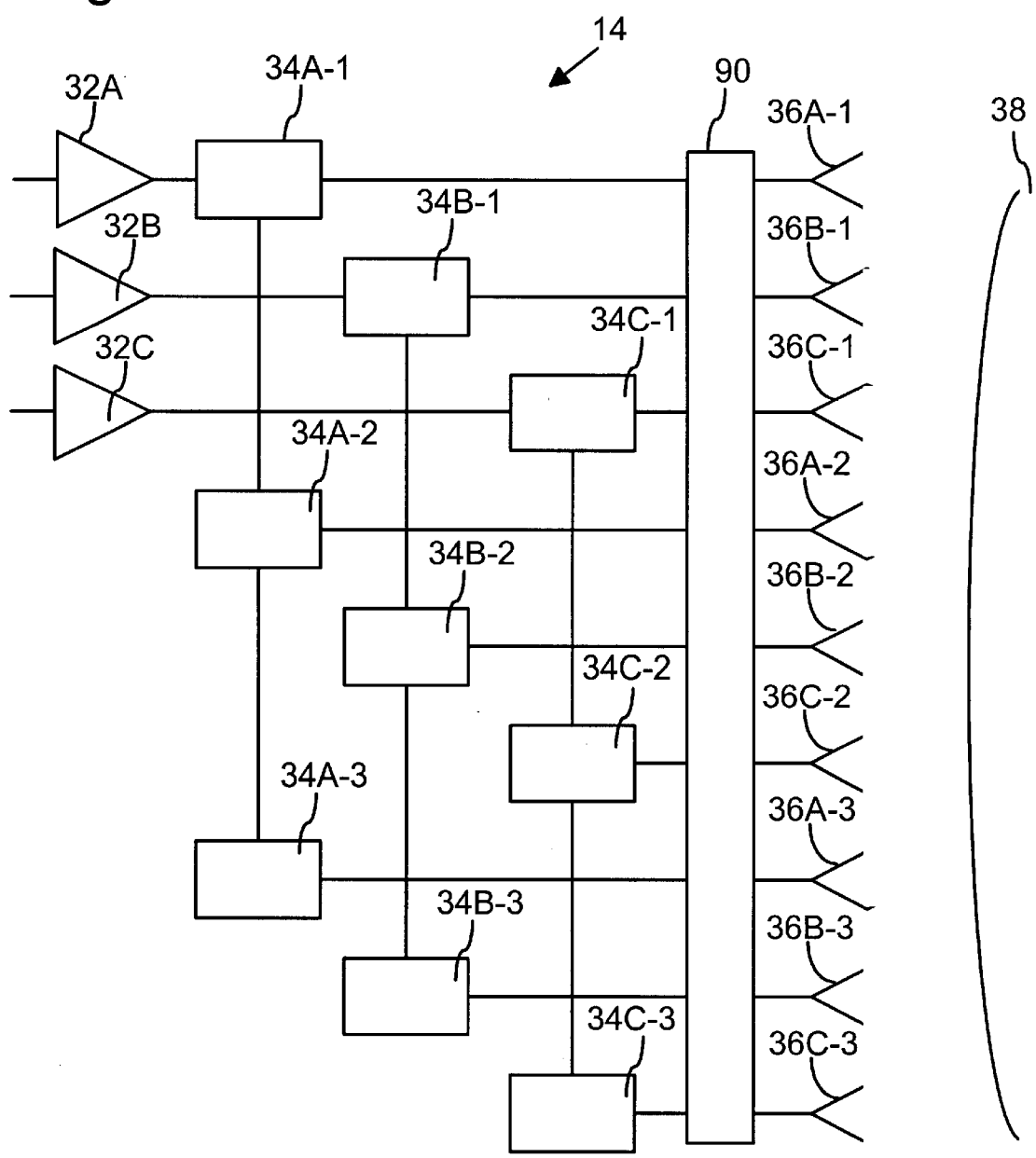
FIG. 7 is a circuit block diagram of an alternative communication signal transmitting system with multiplexed communication signal amplifiers and a switching array to selectively route communication signals to different satellite transmit horns.

FIG. 7 is a circuit block diagram of an alternative communication signal transmitting system 14A with multiplexed TWT amplifiers 32 (only three shown) with each TWT amplifier 32 multiplexed among three transmit horns 36. Each transmit horn 36 transmits a downlink communication signal to a corresponding one of cells 52 or cells 80 (FIG. 6). As with transmitting system 14 of FIG. 3, the output frequency filters 34 (e.g., filters 34A-1, 34A-2, and 34A-3) pass to respective transmit horns 36A-1, 36A-2, and 36A-3 different portions, segments, or sub-bands of a given output frequency band each TWT amplifier 32 (e.g., amplifier 32A).

In addition, transmitting system 14A further includes a switching array 90 to selectively route to different transmit horns 36 the communication signal sub-bands obtained from a TWT amplifier 32 by its associated output frequency filters 34. As illustrated with reference to FIGS. 3 and 6, spatially distributing the communication signal sub-bands obtained from a TWT amplifier 32 among cells in regions with different rain characteristics reduces the likelihood that multiple cells associated with a TWT amplifier 32 will have rain at the same time. In the nomenclature of FIGS. 4–6, the numeric suffices correspond to different communication signal sub-bands. Switching array 90 would switch between different transmit horns 36 the communication signals of the same sub-band to maintain the spatial separation between sub-bands described above. With reference to FIG. 7, for example, the signals provided by filters 34A-1, 34B-1 and 34C-1 could be switched among transmit horns 36A-1, 36B-1, and 36C-1.

Despite a reduction in likelihood, it could still simultaneously rain in multiple cells associated with a TWT amplifier 32. With excessive rain in multiple cells simultaneously, the power available from the TWT amplifier 32 can be inadequate to transmit the communication signals to one or more of the cells without unacceptable signal degradation. Switching array 90 allows the individual communication signals provided by TWT amplifiers 32 to be switched between cells so that only one cell associated with a TWT amplifier 32 has rain. With such switching provided by switching array 90, all of the excess power margin available from the TWT amplifier 32 may be applied to the one cell with rain to overcome the signal degradation caused by the rain.

The allocation of excess power margin available from TWT amplifiers 32 and the switching between cells and TWT amplifiers 32 provided by switching array 90 are performed dynamically according to rain or other downlink signal degradation conditions in the different cells (e.g., excessive traffic or bandwidth demands). In connection with this dynamic allocation of resources on satellite 10, either the downlink signal degradation is detected or a condition (e.g., rain) that might cause downlink signal degradation is detected.

The downlink signal degradation may be detected in a variety of ways. As one example of ground-based detection of downlink signal degradation, downlink signal degradation could be detected at individual reception stations and the degradation information transmitted by terrestrial channels (e.g., telephone lines) to a terrestrial control center. The downlink signal degradation could also be classified as to whether it exceeds a predetermined maximum level of acceptable degradation before additional processing is performed. The control center would include programmed information processing or computer systems for processing the information. As another example, a control center could identify terrestrial regions experiencing significant rainfall and designate those regions as likely to be experiencing significant downlink signal degradation.

In one implementation a recipient of a transmission (i.e., an end user) may monitor signal strength of a satellite beacon that is transmitted from satellite 10, the bit error rate (BER) of the demodulated beacon signal, sky temperature, etc. When criteria warrants system action, the end user's equipment will contact a regional or local control hub for the cell, the main control center or station, or satellite 10 directly (depending on where the resource allocation decision making is done). The contact may be made automatically by the user's equipment or manually by the user and may be via land line or via the satellite itself.

In another implementation the cell hub monitors the beacon signal strength or resulting demodulated BER, sky temp, weather radar data for the cell, etc. The cell hub will then assess the resource requirements for its cell and relay this information to the main control center or satellite 10 (depending on where the resource allocation decision is being made). The relay may be made automatically by the cell hub or manually by a hub operator and may be via land line or the satellite itself. The cell hub may have equipment capable of assessing cell traffic loads, in which case the hub could directly request additional resource allocation for its cell.

In the implementations described above, power is allocated between cells and TWT amplifiers to overcome localized signal degradation caused by rain: Signal degradation can arise from other causes, however, including high volumes of communication signals or traffic on a communication channel. Accordingly, another example of a downlink resource that can be re-allocated to compensate for downlink signal degradation is the data code rates utilized for different cells.

Figure 8A:
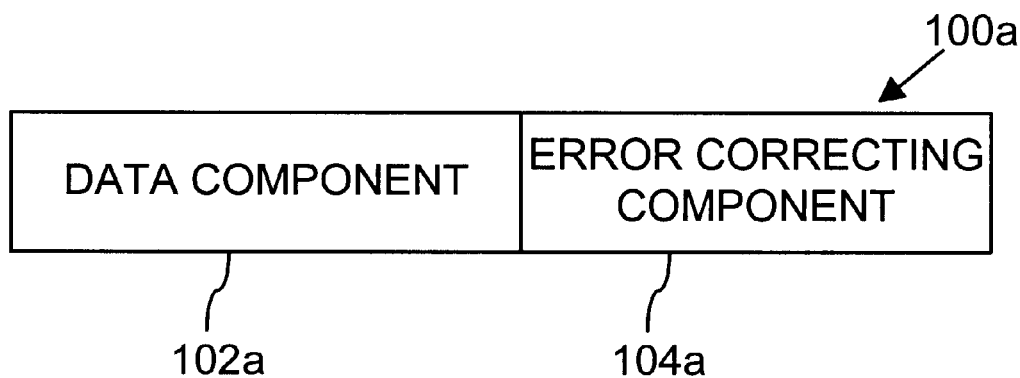
FIGS. 8A and 8B schematically illustrate downlink signals with different relative data components and error correcting components.

Downlink signals may be transmitted at selected frequencies in a digital data format that includes a data component and an error correcting component. FIG. 8A schematically illustrates a digital data format 100a with a data component 102a and an error correcting component 104a. (The relative portions of components 104a and 104b are exaggerated for illustration.) The error correcting component 104a is determined from the data component 102a and assures that errors in the transmission of the data component 102a are identified and corrected, as is known in the art.

Figure 8B:
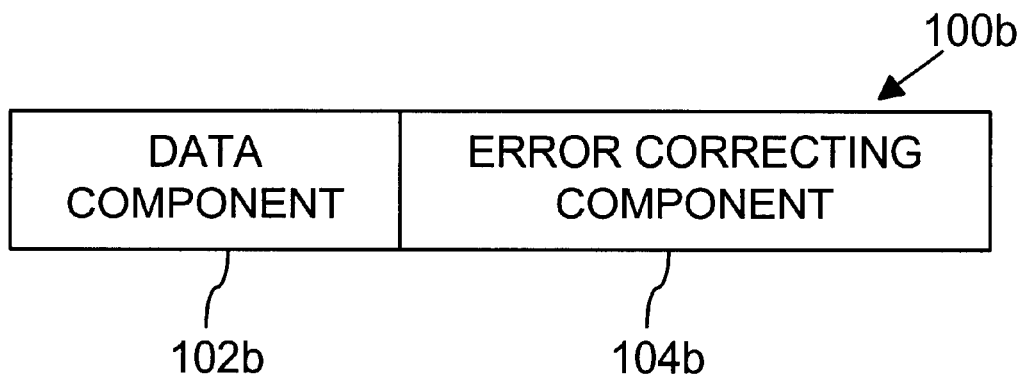

The typical error correcting component 104a makes up a predetermined fraction of the entire digital data format 100a to provide error correction capabilities suitable for normal transmission conditions. With excessive downlink signal degradation caused by localized rain, for example, the typical error correcting component 104a is inadequate to correct the larger numbers of transmission errors that occur. The typical result is downlink signal degradation. In accordance with the present invention, however, an increased fraction of downlink signal allocated to the error correcting component of the downlink signal can compensate for excessive downlink signal degradation. FIG. 8B schematically illustrates a downlink signal 100b with an enhanced error correcting component 104b and a corresponding data component 102b.

The code rate (R) is defined by $R=k/n$ and can be interpreted as the number of information bits per transmitted bits, where k is the number of information bits 102, and n is the total number of bits transmitted (i.e., the sum of bits 102 and 104). Error correction coding results in overhead, thus $n>k$ and $R<1$. By decreasing the code rate, more bits are needed to transmit the same amount of information, but the transmission is more robust to signal degradation. To get the same information throughput, bandwidth must increase as coding rate decreases.

Alternatively, as traffic demands increase for the communication channel of a cell, decreasing the error correcting component (i.e., increasing the code rate) can provide proportionally greater bandwidth for the data component of the communication channel. To maintain signal integrity with a decreased error correcting component, the power allocation for the cell may be increased as described above.

Moreover, the cells associated with a given TWT amplifier 32 may be distributed among regions having light, moderate, and heavy communication traffic in substantially the same way that FIG. 6 illustrates cells being distributed among cells in regions of light, moderate, and heavy rainfall. As a result, the illustration of FIG. 6 relating to cells being distributed among regions with different rainfall characteristics is similarly applicable to distributing cells among regions with different communication traffic volumes. For example, heavily urbanized areas would typically be more susceptible to large increases in communication traffic than more rural areas.

The distribution of cells according to communication traffic volumes also allows additional power to be allocated selectively to cells with traffic increases according to localized increases in communication traffic. The allocation of power for traffic increases may be performed in the manner described above with reference to power allocations for rain. It will be appreciated, therefore, that regional rainfall characteristics and traffic volumes are two separate variables that may be considered simultaneously in determining which cells are assigned to a given TWT amplifier 32. Regional rainfall characteristics and traffic volumes may also be considered simultaneously in the allocation of additional power when increased power is required to maintain signal integrity.

The multiplexed TWT amplifiers 32 described above can significantly reduce the number of TWT amplifiers 32 required for a given number of geographic cells. This has the advantage of reducing the cost and weight of a satellite and allowing the satellite to provide communications to a greater number of cells. In some prior communication satellite designs, the number of cells to which a satellite could provide communications was limited by the size and weight of the required TWT amplifiers. These satellite size and weight advantages may be similarly applied the receiving system 12 (FIG. 1) of a communication satellite.

Figure 9:
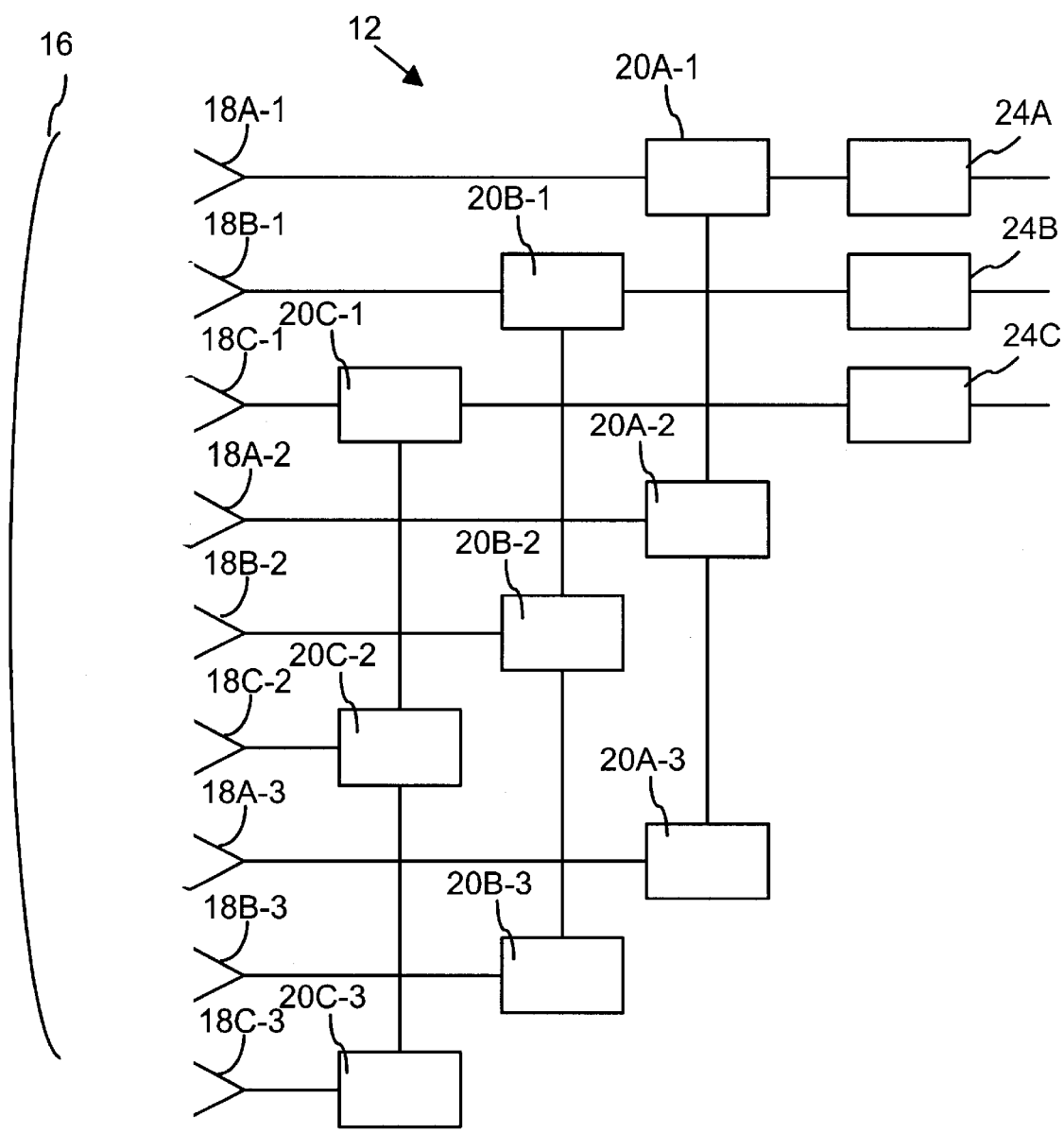
FIG. 9 is a circuit block diagram of communication signal receiving system with multiplexed receivers.

FIG. 9 is a circuit block diagram of communication signal receiving system 12 with receivers 24 (only three shown) multiplexed in a manner analogous to the multiplexing of TWT amplifiers 32. In the implementation shown in FIG. 9, each receiver 24 is multiplexed among three receive horns 18. Each receive horn 18 receives from a transmitting station an uplink communication signal for transmission to a corresponding cell (e.g., a cell 52). It will be appreciated, however, that the illustrated 1×3 multiplexing is merely exemplary and that greater degrees of multiplexing can be applied to receivers 24.

With reference to receiver 24A, for example, three input frequency filters 20A-1, 20A-2, and 20A-3 receive different portions or segments of a given uplink frequency band from respective receive horns 18A-1, 18A-2, and 18A-3. As one example, each receiver 24, including receiver 24A, is adapted to receive and amplify all of the nominal 500 MHz bandwidth of a Ku-band uplink communication channel. Accordingly, input frequency filters 20A-1, 20A-2, and 20A-3 pass signals with frequencies within different nominal 167 MHz sub-bands of the Ku-band channel. With a Ku-band downlink communication channel of 12.200–12.700 GHz, frequency filter 20A-1 could pass communication signals for frequencies in the sub-band 12.200–12.367 Ghz, frequency filter 20A-2 could pass communication signals for frequencies in the sub-band 12.367–12.533 Ghz, and frequency filter 20A-3 could pass communication signals for frequencies in the sub-band 12.533–12.700 Ghz. It will be appreciated that references to the KU-band uplink communication channel is only illustrative and is not a limitation on the scope of application for receiving system 12.

In view of the many possible embodiments to which the principles of our invention may be applied, it should be recognized that the detailed embodiments are illustrative only and should not be taken as limiting the scope of our invention. For example, while the embodiments described are directed primarily to degradation in downlink communication signals, the present invention is similarly applicable to other types of downlink signals (e.g., control signals). Accordingly, the invention includes all such embodiments as may come within the scope and spirit of the following claims and equivalents thereto.

What is claimed is:

1. In a communication satellite having plural communication signal amplifiers coupled to plural transmit horns that transmit communication signals to plural corresponding geographic cells, the improvement comprising:

multiplexing between the communication signal amplifiers and the transmit horns so that each of the communication signal amplifiers delivers plural distinct communication signals to plural respective transmit horns, the multiplexing being frequency multiplexing in which the plural distinct communication signals delivered by a communication signal amplifier to plural respective transmit horns are carried on frequency-distinct communication sub-bands.

2. The satellite of claim 1 in which the multiplexing provides that each communication signal amplifier delivers at least three distinct communication signals to the plural respective transmit horns.

3. The satellite of claim 1 in which at least selected ones of the geographic cells are characterized as receiving more or less rain and the transmit horns coupled to at least selected ones of the communication signal amplifiers transmit communication signals to at least one the cells characterized as receiving more rain and at least one the cells characterized as receiving less rain.

4. The satellite of claim 3 in which the communication signal amplifiers apply amplification power to the communication signals and the selected ones of the communication signal amplifiers apply greater amplification power to communication signals being transmitted to geographic cells where it is raining.

5. The satellite of claim 4 in which the greater amplification power is applied dynamically to the communication signals transmitted to geographic cells with rain based upon detection of the rain.

6. The satellite of claim 3 in which the communication signal amplifiers apply amplification power to the communication signals and the selected ones of the communication signal amplifiers apply greater amplification power to communication signals being transmitted to geographic cells where it is raining and that are characterized as receiving more rain than the amplification power applied to communication signals being transmitted to geographic cells where it is raining and that are characterized as receiving less rain.

7. The satellite of claim 1 in which each of the geographic cells is characterized as receiving more or less rain and the transmit horns coupled to each of the communication signal amplifiers transmit communication signals to at least one of the cells characterized as receiving more rain and at least one of the cells characterized as receiving less rain.

8. The satellite of claim 1 in which at least selected ones of the geographic cells are characterized as receiving more or less communication traffic from the satellite and the transmit horns coupled to at least selected ones of the communication signal amplifiers transmit communication signals to at least one the cells characterized as receiving more communication traffic and at least one the cells characterized as receiving less communication traffic.

9. The satellite of claim 8 in which the communication signal amplifiers apply amplification power to the communication signals and the selected ones of the communication signal amplifiers apply greater amplification power to communication signals being transmitted to geographic cells with excess communication traffic.

10. The satellite of claim 8 in which the communication signal amplifiers apply amplification power to the communication signals and the selected ones of the communication signal amplifiers apply greater amplification power to communication signals being transmitted to geographic cells that are characterized as receiving more communication traffic and have exces communication traffic than the amplification power applied to communication signals being transmitted to geographic cells that are characterized as receiving less communication traffic and have excess communication traffic.

11. The satellite of claim 1 in which the geographic cell to which each transmit horn transmits is distinct from the geographic cells to which each of the other transmit horns transmits.

12. The satellite of claim 1 in which the communication signal amplifiers include traveling wave tube amplifiers.

13. In a communication satellite having plural communication signal amplifiers coupled to plural transmit horns that transmit communication signals to plural corresponding geographic cells, the improvement comprising:
    multiplexing between the communication signal amplifiers and the transmit horns so that each of the communication signal amplifiers delivers plural distinct communication signals to plural respective transmit horns, the plural distinct communication signals delivered by a communication signal amplifier to plural respective transmit horns being carried on frequency-distinct communication sub-bands and the multiplexing including a frequency filter coupled to each communication signal amplifier for each communication sub-band.

14. In a communication satellite having plural communication signal amplifiers coupled to plural transmit horns that transmit communication signals to plural corresponding geographic cells, the improvement comprising:
    multiplexing between the communication signal amplifiers and the transmit horns so that each of the communication signal amplifiers delivers plural distinct communication signals to plural respective transmit horns, each of the communication signal amplifiers delivering plural distinct communication signals to plural respective transmit horns on a common set of frequency-distinct communication sub-bands.

15. The satellite of claim 14 in which the transmit horns are coupled to the communication signal amplifiers so that immediately adjacent geographic cells do not receive communication signals on the same communication sub-bands.

16. The satellite of claim 14 in which the transmit horns are coupled to the communication signal amplifiers so that the geographic cells associated with each communication signal amplifier are spatially separated from each other by other geographic cells.

17. The satellite of claim 16 in which the transmit horns are coupled to the communication signal amplifiers so that the spatial separation between the geographic cells associated with each communication signal amplifier is maximized.

18. The satellite of claim 14 in which the multiplexing provides that each communication signal amplifier delivers at least three distinct communication signals to respective transmit horns.

19. In a communication satellite having plural communication signal amplifiers coupled to plural transmit horns that transmit communication signals to plural corresponding geographic cells, the improvement comprising:
    multiplexing between the communication signal amplifiers and the transmit horns so that each of the communication signal amplifiers delivers plural distinct communication signals to plural respective transmit horns, each of the communication signal amplifiers delivering plural distinct communication signals to plural respective transmit horns on a common set of frequency-distinct communication sub-bands; and
    a switching array that selectively changes the interconnections between the communication signal amplifiers and the transmit horns.

20. The satellite of claim 19 in which plural ones of the transmit horns associated with at least one communication signal amplifier direct communication signals to geographic cells where it is raining and in which the switching array selectively changes the interconnections between the communication signal amplifiers and the transmit horns to reduce the number of transmit horns that are associated with the at least one communication signal amplifier and are directing communication signals to geographic cells where it is raining.

21. The satellite of claim 19 in which plural ones of the transmit horns associated with at least one communication signal amplifier direct communication signals to geographic cells with excess communication traffic and in which the switching array selectively changes the interconnections between the communication signal amplifiers and the transmit horns to reduce the number of transmit horns that are associated with the at least one communication signal amplifier and are directing communication signals to geographic cells with excess traffic.

22. The satellite of claim 19 in which plural ones of the transmit horns associated with at least one communication signal amplifier direct communication signals to geographic cells with increased transmission power requirements and in which the switching array selectively changes the interconnections between the communication signal amplifiers and the transmit horns to reduce the number of transmit horns that are associated with the at least one communication signal amplifier and are directing communication signals to geographic cells with increased transmission power requirements.

23. The satellite of claim 19 in which each transmit horn receives the same communication sub-band before and after changes in the interconnections between the communication signal amplifiers and the transmit horns.

24. In a communication satellite having plural communication signal amplifiers coupled to plural transmit horns that transmit communication signals to plural corresponding geographic cells, the improvement comprising:
    multiplexing between the communication signal amplifiers and the transmit horns so that each of the communication signal amplifiers delivers plural distinct communication signals to plural respective transmit horns;
    plural communication signal receivers coupled to plural receive horns that receive communication signals corresponding to plural geographic cells; and
    multiplexing between the receivers and the receive horns so that each the receivers receives plural distinct communication signals from plural respective receive horns.

25. In a communication satellite having plural communication signal amplifiers coupled to plural transmit horns that transmit communication signals to plural corresponding geographic cells, a method comprising:
    delivering plural distinct communication signals to plural respective transmit horns from each of the communication signal amplifiers, including frequency multiplexing the plural distinct communication signals delivered by each communication signal amplifier among plural frequency-distinct communication sub-bands.

26. The method of claim 25 further comprising delivering at least three distinct communication signals to the plural respective transmit horns from each of the communication signal amplifiers.

27. The method of claim 25 further comprising characterizing at least selected ones of the geographic cells as receiving more or less rain, and for selected ones of the communication signal amplifiers, delivering a communication signal to at least one transmit horn that transmits communication signals to at least one the cells characterized as receiving more rain and delivering a communication signal to at least one transmit horn that transmits communication signals to at least one the cells characterized as receiving less rain.

28. The method of claim 27 in which the communication signal amplifiers apply amplification power to the communication signals and the method further comprises applying greater amplification power to communication signals being transmitted to geographic cells where it is raining than the amplification power applied to communication signals being transmitted to geographic cells where it is not raining.

29. The method of claim 27 in which the communication signal amplifiers apply amplification power to the communication signals and the method further comprises the selected ones of the communication signal amplifiers applying greater amplification power to communication signals being transmitted to geographic cells where it is raining and that are characterized as receiving more rain than the amplification power applied to communication signals being transmitted to geographic cells where it is raining and that are characterized as receiving less rain.

30. The method of claim 27 in which the selected ones of the communication signal amplifiers are all of the communication signal amplifiers.

31. In a communication satellite having plural communication signal amplifiers coupled to plural transmit horns that transmit communication signals to plural corresponding geographic cells, a method comprising:
    delivering plural distinct communication signals to plural respective transmit horns from each of the communication signal amplifiers on a common set of frequency-distinct communication sub-bands from each of the communication signal amplifiers.

32. The method of claim 31 further comprising transmitting communication signals from the transmit horns so that immediately adjacent geographic cells do not receive communication signals on the same communication sub-bands.

33. In a communication satellite having plural communication signal amplifiers coupled to plural transmit horns that transmit communication signals to plural corresponding geographic cells and plural communication signal receivers coupled to plural receive horns that receive communication signals corresponding to plural geographic cells, a method comprising:
    delivering plural distinct communication signals to plural respective transmit horns from each of the communication signal amplifiers; and
    delivering plural distinct communication signals to each of the receivers from plural respective ones of the receive horns.

34. In a communication satellite having plural communication signal amplifiers that amplify plural communication signals with amplification power, and plural transmit horns that transmit the communication signals to plural corresponding geographic cells, a method comprising:
    delivering plural distinct communication signals to plural respective transmit horns from each of the communication signal amplifiers, including frequency multiplexing the plural distinct communication signals delivered by each communication signal amplifier among plural frequency-distinct communication sub-bands; and
    dynamically allocating amplification power between the communication signals according to real-time degradation of the communication signals transmitted to at least selected ones of the geographic cells.

35. The method of claim 34 in which the real-time degradation of the communication signals is caused by rain in the selected ones of the geographic cells.

36. The method of claim 34 in which allocating amplification power includes dynamically allocating the power applied to plural distinct communication signals by one communication signal amplifier.

37. The method of claim 34 in which allocating amplification power includes dynamically allocating the power applied to plural distinct communication signals by separate communication signal amplifier.

38. In a communication satellite having plural communication signal receivers coupled to plural receive horns that receive communication signals for plural corresponding geographic cells, the improvement comprising:
    multiplexing between the communication signal receivers and the receive horns so that each of the communication signal receivers receives plural distinct communication signals from plural respective receive horns.

39. The satellite of claim 38 in which the multiplexing is frequency multiplexing in which the plural distinct communication signals delivered to a communication signal receiver from plural respective receive horns are carried on frequency-distinct communication sub-bands.

40. The satellite of claim 38 in which the plural distinct communication signals delivered to a communication signal receiver from plural respective receive horns are carried on frequency-distinct communication sub-bands and the multiplexing includes a frequency filter coupled to each communication signal receiver for each communication sub-band.

41. The satellite of claim 38 in which the multiplexing provides that each communication signal receiver receives at least three distinct communication signals from the plural respective receive horns.

42. The satellite of claim 38 in which each of the communication signal receivers receives plural distinct communication signals from plural respective receive horns on a common set of frequency-distinct communication sub-bands.

* * * * *